United States Patent [19]
Gropp et al.

[11] Patent Number: 5,379,580
[45] Date of Patent: Jan. 10, 1995

[54] CROP CONDITIONER WITH FORAGE MAT SEPARATING DEVICE

[75] Inventors: Heiko Gropp, Syrgenstein; Frank Leppat, Dillingen; Martin Häfele, Adelmannsfelden, all of Germany

[73] Assignee: Klockner-Humboldt-Deutz AG, Cologne, Germany

[21] Appl. No.: 122,008

[22] Filed: Sep. 15, 1993

[30] Foreign Application Priority Data

Sep. 24, 1992 [DE] Germany ................ 4231923

[51] Int. Cl.⁶ .............. A01D 43/10; A01D 82/00; A01D 90/10
[52] U.S. Cl. ....................... 56/192; 56/DIG. 1
[58] Field of Search .......... 56/16.4, 189, 192, DIG. 1; 460/111

[56] References Cited

U.S. PATENT DOCUMENTS

| | | | |
|---|---|---|---|
| 2,908,126 | 10/1959 | Dyrdahl | 56/192 X |
| 3,613,336 | 10/1971 | Smith | 56/192 X |
| 4,265,076 | 5/1981 | Krutz | 56/DIG. 1 |

FOREIGN PATENT DOCUMENTS

| | | | |
|---|---|---|---|
| 0086458 | 8/1983 | European Pat. Off. | |
| 2653463 | 6/1978 | Germany | 56/DIG. 1 |
| 3923637 | 6/1992 | Germany | |
| 1166715 | 7/1985 | U.S.S.R. | 56/189 |

*Primary Examiner*—David J. Bagnell
*Attorney, Agent, or Firm*—Hardaway Law Firm; Charles L. Schwab

[57] ABSTRACT

A harvester for processing forage including a cutter, a conveyor and a preparation apparatus for forming a mat of forage, the mat exiting at the discharge end of the preparation apparatus. A separation roller is positioned at the discharge end of the preparation apparatus to separate the mat from the preparation apparatus.

19 Claims, 3 Drawing Sheets

CROP CONDITIONER WITH FORAGE MAT SEPARATING DEVICE

TECHNICAL FIELD

This invention relates to a harvester for forage processing which produces a mat of conditioned crop material or forage.

BACKGROUND OF THE INVENTION

From German patent document DE 39 23 637 there is known a self-propelled harvester for forage processing. This harvester essentially has cutting, conveying and processing means for the harvested material. At the end of the mat-forming preparation process, the mat is delivered on the field, for example via a delivery belt.

In the course of field tests it has been found that, on the basis of this processing (among other steps, compression of the forage under high pressure), the mat exhibits the property of adhering to a preparation means or to the delivery belt. Thus, in the worst case, the mat is transported farther by the delivery belt (for example, on the bottom side), so that the operation of the harvester may be impaired (clogging, defective delivery of the mat).

OBJECTS AND BRIEF SUMMARY OF THE INVENTION

It is an object of the invention to design the harvester in such a fashion that the mat, detached from a preparation means, can be delivered at the end of the preparation process and operation of the harvester is not impaired.

This object is achieved by providing a harvester which has in an end region of a preparation means, a device that separates the mat leaving the preparation means from said preparation means. By this means the mat is delivered behind the harvester in the direction of travel and does not adhere to the preparation means. Operation of the harvester without malfunctions is insured by the device of this invention.

In development of the invention, the preparation means is a compression means that, in a fashion known per se, consists of at least two matting compression rolls assigned to one another; and the separating device, designed as a roller, is arranged in parallel fashion behind a compression roll in the conveying direction of the mat. The advantage of this arrangement, is that the mat of crop material compressed by the compression means is easily separated from the compression rolls and the mat is delivered to the ground in a desirable condition. The previously encountered problem of the mat adhering to the compression rolls on account of the high compression pressure, is obviated.

In development of the invention, the device, in the form of a separating roller, is provided with a surface structure promoting separation. Optimal separation is insured by means of this surface structure (for example, profiling, brush-like design).

In one embodiment of the invention, the surface structure is formed by fins arranged parallel to the longitudinal axis of the roller. On the separating basis of this design, a particularly efficient separation process is insured because the fins, which are arranged substantially over the full width of the separating roller (such width corresponding to the width of one compression roll) strip the mat from the compression means.

In a further embodiment of the invention, the fins are designed at least partially elastically deformable. Where the compression means consists of compression rolls assigned to one another and a circulating belt is arranged around at least two compression rolls along the conveying direction of the mat, the partially elastically deformable design of the fins has the advantage that the fins can adapt to the external outline of the compression means (in particular of the belt) by deforming. By this means, the clearance between the compression means (compression roll or belt) and the fins can be minimized, so that optimal stripping takes place. Furthermore, the elastic deformability has the advantage that a seam of the belt does not impair the operation of the harvester.

In development of the invention, the roller is arranged movably (pivotably) parallel to a compression roll. This is to be realized, first, by means of the fact that the roller is pivoted on a circular path about the midpoint of a compression roll. Second, it is conceivable that the roller is pivoted on an elliptical path about the midpoint of a compression roll. On the basis of both pivoting possibilities, optimal adjustment possibilities exist (with regard to the position of the roller relative to a compression roll and with regard to the spacing between the roller and the compression roll).

In development of the invention, the roller is supported in force-loaded fashion. By means of a roller supported, for example, against a force of a spring, there is a factor of safety (for example in the case of clogging).

In development of the invention, the roller exhibits a self-contained drive or is driven by means of a connection to the compression means or to a compression roll. The self-contained drive can be, for example, an electric motor or a hydraulic drive. This use of the two components cited by way of example has the advantage that the rotation speed of the roller is arbitrarily adjustable. The term self-contained drive should also be understood to mean such a drive when the roller (in particular when a gearbox, an intermediate gear, or a similar transmission is connected in intermediate position) is driven by a prime mover of the harvester (for example, an internal combustion engine or a hydraulic motor). When the roller is driven by means of connection to a compression roll, such connection is implemented by means of a belt, chain, gear, or universal shaft connection.

In a further embodiment of the invention, the roller rotates at the same peripheral speed as a compression roll. This has the advantage that an optimal stripping process is insured.

BRIEF DESCRIPTION OF THE DRAWINGS

Further embodiments, in particular design embodiments, of the device in accordance with the invention are described in what follows and illustrated in the Figures.

DETAILED DESCRIPTION OF THE DRAWINGS

Figure 1:
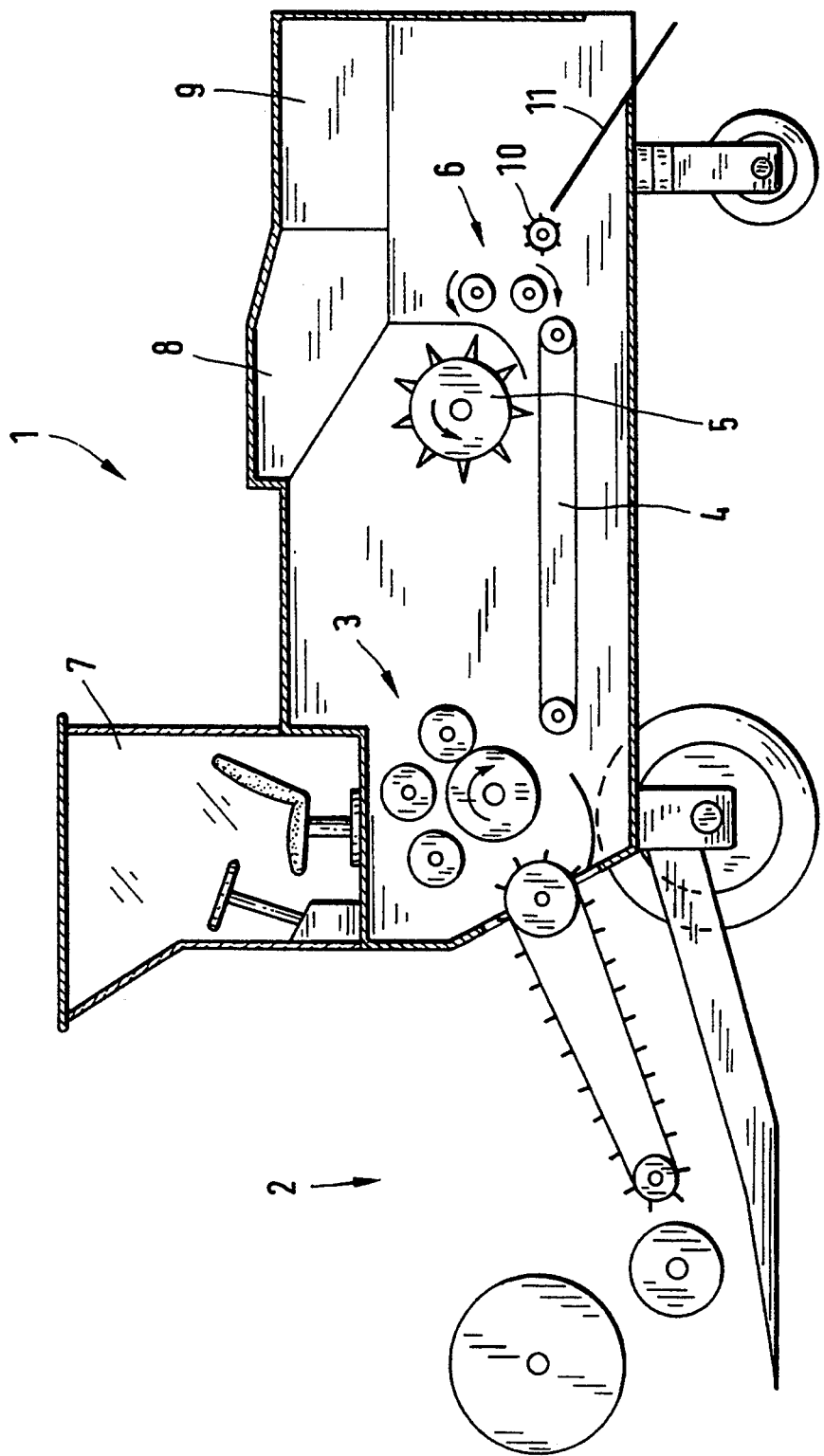
FIG. 1 shows a harvester that is equipped with a device in accordance with the invention.

FIG. 1 shows a harvester that is equipped with a device in accordance with the invention. A self-propelled (or towed) harvester 1 is equipped with a crop or forage cutting and conveying means 2 as well as a forage processing means 3. Via a conveyor belt 4, the processed harvested material is transported to a metering roller 5, from where a compression means 6, in the form of a pair of matting rollers, is charged. Furthermore, the harvester 1 consists of a driver's cab 7 as well as a diesel engine 9 supplied from a fuel tank 8. As is shown in FIG. 1, in an end region of a forage preparation means (compression means 6), there is provided a device designed as a roller 10, which device separates the mat leaving the preparation means from said preparation means. The direction of rotation of the roller 10 and of the compression roll assigned to the roller 10 in the compression means 6 is the same. Behind the roller 10 there is provided a delivery chute 11, via which the processed and compressed mat is delivered at the rear end of the harvester 1 (as viewed in the direction of travel).

Figure 2:
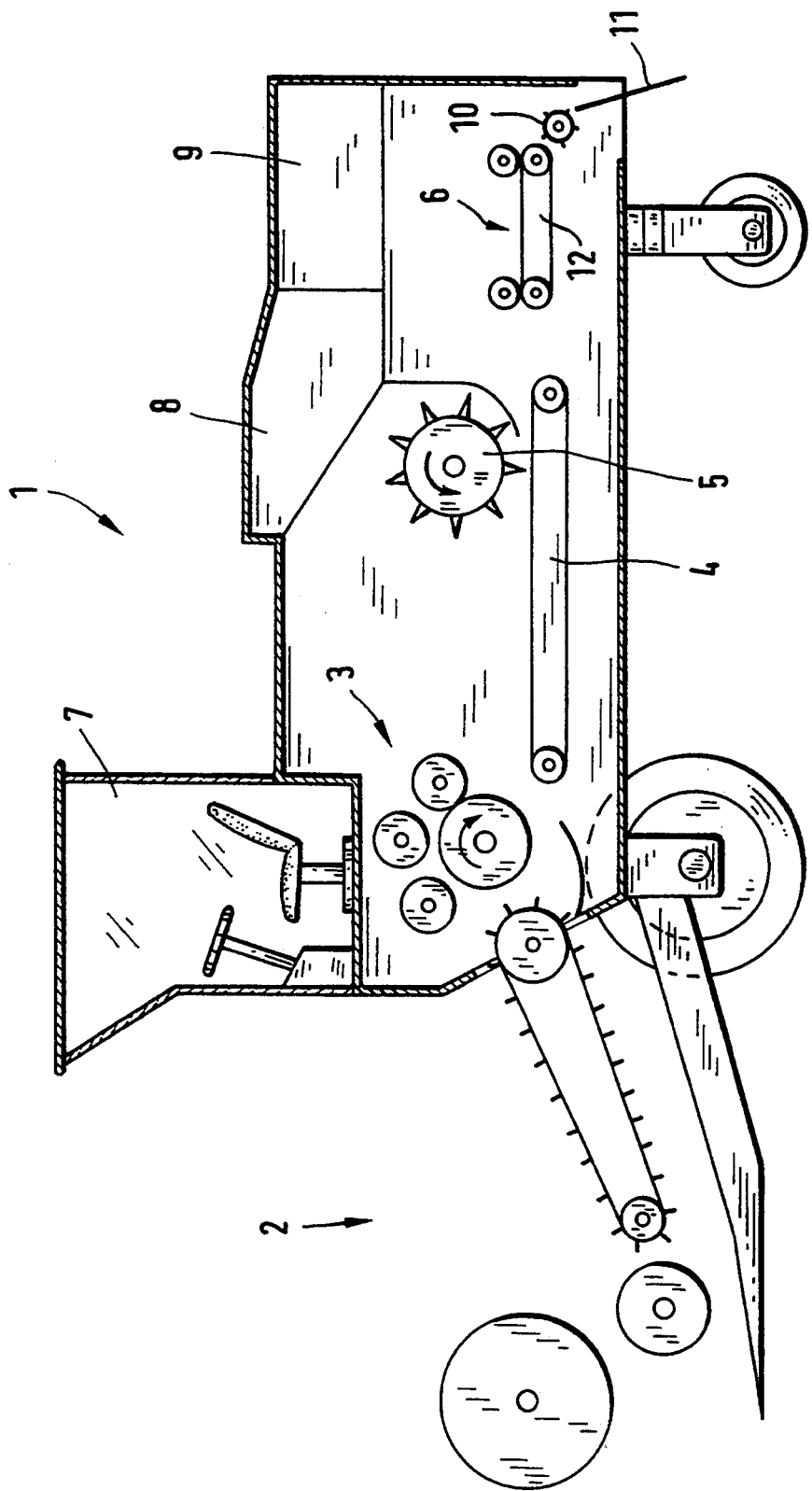
FIG. 2 shows a second harvester that is equipped with a device in accordance with the invention.

FIG. 2 shows a second harvester that is equipped with a device in accordance with the invention. Besides the components of the harvester 1 that were shown in FIG. 1 and described, it is shown in this Figure that the compression means 6 consists of two pairs of matting upper and lower parallel compression rolls spaced in the direction of travel of the forage mat, a circulating belt 12 being arranged around the two lower compression rolls. The separation roller 10 is again assigned to the last compression roll, as viewed in the conveying direction, around which the belt 12 runs. Behind the roller 10, again, the mat is delivered to the ground by means of the delivery chute 11.

Figure 3:
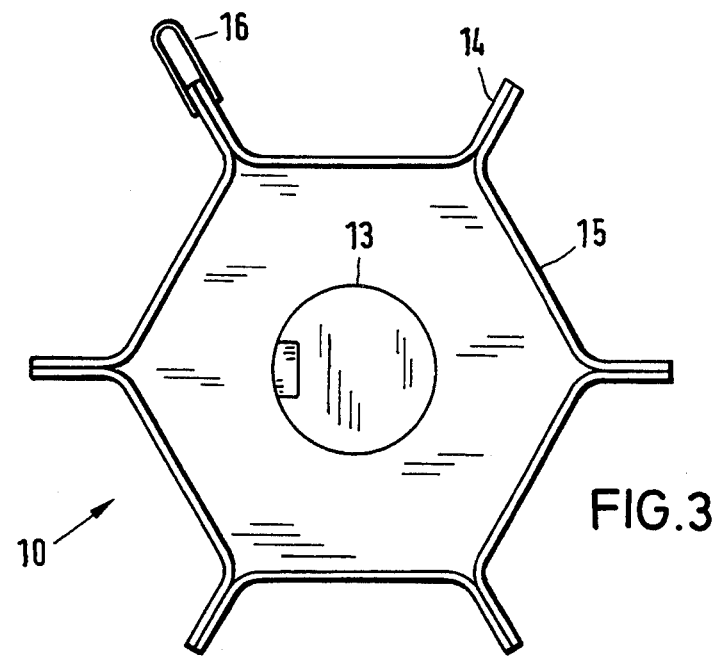
FIG. 3 shows design embodiments of a roll.

FIG. 3 shows the design embodiment of the roller 10. The roller 10 consists of sheet-metal parts 15 arranged about a longitudinal axis 13 and forming fins 14. In order to achieve a close clearance between a compression roll (or the belt 12) of the compression means 6 and the fins 14, it is conceivable and is shown in FIG. 3 to design the fins 14 in at least partially elastically deformable fashion. This can take place, for example, by means of an elastically deformable extension 16. It is further conceivable to arrange the extension 16 between the fins 14.

Figure 4:
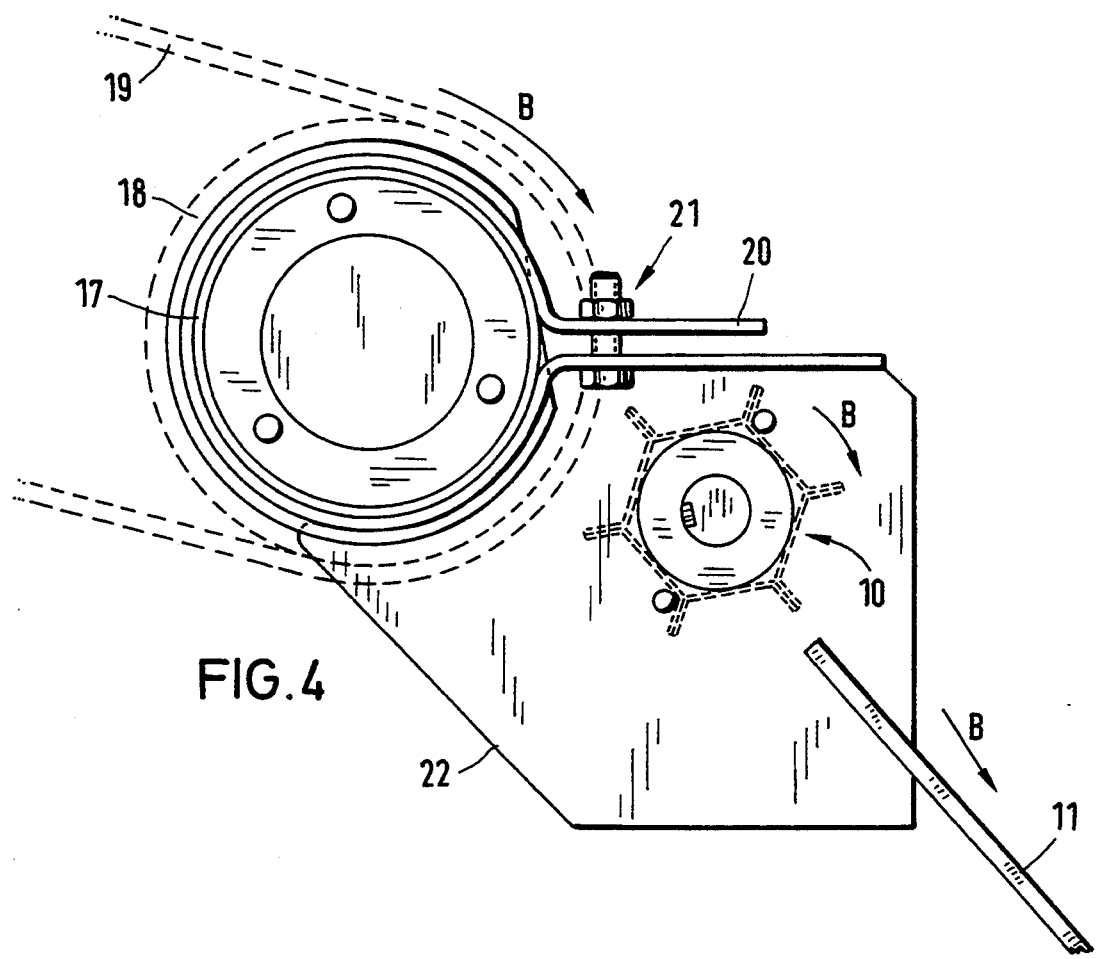
FIG. 4 shows an arrangement of a pivotable roll.

FIG. 4 shows an arrangement of a pivotable roller 10. A compression roll 17 of the compression means 6 is provided with a coating 18 (in particular, elastically deformable). Around this compression roll 17 and at least one further other compression roll (not shown) runs a belt 19 (or, respectively, belt 12). The roller 10, supported in a mounting part 22, is pivotable about the axis of the compression roll 17 with a clamp piece 20, which is fixable with a bolt connection 21. By this means it is possible to change the position of roller 10 to compression roll 17 and to adjust optimally a required position for the stripping process. The symbol B denotes the conveying direction of the mat. In order to insure the optimal stripping process, the compression roll 17 and the roller 10 have equal peripheral speeds and the same sense of rotation. The drive of the roller 10 (by means of toothed belt, chain, gear, or self-contained drive) is not shown but present. Furthermore, it is conceivable to arrange the roller behind each preparation means (for example, also behind the processing means). The term "separate" used before should be understood to mean that the mat exiting from the preparation means is detached or lifted off said preparation means by the roller 10.

What is claimed is:

1. A harvester for forage processing including
   a forage cutting means,
   a forage conveying means,
   a forage preparation means including a forage receiving end receiving forage from said conveying means and a forage discharge end, said forage preparation means including at least two mating compression rolls and being operable to form a mat of forage which exits at the discharge end of said preparation means, and
   a separating device positioned at said discharge end of said preparation means operable to separate said mat from said preparation means, said separating device including a roller driven by means of a driven connection to one of said compression rolls, said roller having a surface structure promoting separation.

2. The harvester of claim 1 wherein said surface structure is formed by fins arranged parallel to the longitudinal axis of the roller.

3. The harvester of claim 1 wherein said device is a roller having fins which are at least partially elastically deformable.

4. The harvester of claim 1 wherein said roller is swingable about an axis while maintaining a parallel relationship with said compression rolls.

5. The harvester of claim 4 wherein said axis is the axis of one of said compression rolls.

6. The harvester of claim 1 wherein said roller rotates at the same peripheral speed as one of said compression rolls.

7. A harvester for forage processing including
   a forage cutting means,
   a forage conveying means,
   a forage preparation means including a forage receiving end receiving forage from said conveying means and a forage discharge end, said forage preparation means being operable to form a mat of forage which exits at said discharge end of said preparation means, and
   a roller positioned at said discharge end of said preparation means operable to separate said mat from said preparation means, said roller having a surface structure promoting separation of said mat from said preparation means including fins which are at least partially elastically deformable.

8. The harvester of claim 7 wherein said fins are arranged parallel to the longitudinal axis of said roller.

9. The harvester of claim 7 wherein said roller is swingable relative to said preparation means about an axis spaced from and parallel to the axis of said roller.

10. A harvester for forage processing including
    a forage cutting means,
    a forage conveying means,
    a forage preparation means including a forage receiving end receiving forage from said conveying means and a forage discharge end, said forage preparation means being operable to form a mat of forage which exits at said discharge end of said preparation means, and
    a roller having a surface promoting separation positioned at said discharge end of said preparation means operable to separate said mat from said preparation means, said roller including a self-contained drive.

11. The harvester of claim 10 wherein said roller is swingable relative to said forage preparation means about an axis spaced from and parallel to the axis of said roller.

12. A harvester for forage processing including
a forage cutting means,
a forage conveying means,
a forage preparation means including a forage receiving end receiving forage from said conveying means and a forage discharge end, said forage preparation means including at least two mating compression rolls and being operable to form a mat of forage which exits at the discharge end of said preparation means, and
a separating device positioned at said discharge end of said preparation means operable to separate said mat from said preparation means, said separating device including a roller parallel to said compression rolls and spaced therefrom in the conveying direction of said mat, said roller having a surface promoting separation and being swingable relative to said compression rolls about an axis while maintaining a parallel relationship with said compression rolls.

13. The harvester of claim 12 wherein said roller includes a self-contained drive.

14. The harvester of claim 12 wherein said roller is driven by means of connection to one of said compression rolls.

15. The harvester of claim 12 wherein said axis is the axis of one of said compression rolls.

16. A harvester for forage processing including
a forage cutting means,
a forage conveying means,
a forage preparation means including a forage receiving end receiving forage from said conveying means and a forage discharge end, said forage preparation means including at least two mating compression rolls and being operable to form a mat of forage which exists at the discharge end of said preparation means, and
a separating device positioned at said discharge end of said preparation means operable to separate said mat from said preparation means, said separating device including a roller having a surface promoting separation and being rotated at the same peripheral speed as one of said compression rolls.

17. A harvester for forage processing including
a forage cutting means,
a forage conveying means,
a forage preparation means including a forage receiving end and receiving forage from said conveying means and a forage discharge end, said forage preparation means including upper and lower mating compression rolls operable to form a mat of forage which exists at the discharge end of said preparation means, and
a separating device positioned at said discharge end of said preparation means operable to separate said mat from said preparation means, said separating device including a power driven roller disposed parallel to said compression rolls and spaced therefrom in the conveying direction of said mat, said roller having disposed at substantially the same elevation as said lower compression roll, said roller having fins promoting separation and being driven at a speed effecting en masse movement of said mat.

18. The harvester of claim 17 wherein said roller has the same peripheral speed as one of said compression rolls.

19. The harvester of claim 17 wherein said roller is driven by means of a driven connection with one of said compression rolls.

* * * * *

UNITED STATES PATENT AND TRADEMARK OFFICE
CERTIFICATE OF CORRECTION

PATENT NO. : 5,379,580
DATED : January 10, 1995
INVENTOR(S) : Heiko Gropp, et al.

It is certified that error appears in the above-identified patent and that said Letters Patent is hereby corrected as shown below:

```
Column 4, line 19, cancel "the" and substitute ---said---;
Column 6, line 13, cancel "and";
Column 6, line 25, cancel "having" and substitute ---being---.
```

Signed and Sealed this

Eleventh Day of April, 1995

Attest:

BRUCE LEHMAN

Attesting Officer

Commissioner of Patents and Trademarks